US012709240B2

(12) United States Patent
Ahmed et al.

(10) Patent No.: US 12,709,240 B2
(45) Date of Patent: Aug. 18, 2026

(54) POWER DISTRIBUTION SYSTEM FOR A VEHICLE

(71) Applicant: GM Global Technology Operations LLC, Detroit, MI (US)

(72) Inventors: Mohamed Ahmed Kamel Ahmed, Birmingham, MI (US); Robert A. De Stefano, Macomb Township, MI (US); Jonathan O. Conell, Sterling Heights, MI (US); Lyall Kenneth Winger, Waterloo (CA); Suresh Gopalakrishnan, Troy, MI (US); James Morrison, Wheatley (CA); Dave Gerard Rich, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/926,526

(22) Filed: Oct. 25, 2024

(65) Prior Publication Data

US 2026/0116321 A1 Apr. 30, 2026

(51) Int. Cl.
*B60R 16/033* (2006.01)

(52) U.S. Cl.
CPC .................................. *B60R 16/033* (2013.01)

(58) Field of Classification Search
CPC .................................................... B60R 16/033
See application file for complete search history.

(56) References Cited

U.S. PATENT DOCUMENTS

2016/0059708 A1* 3/2016 Iwasaki ................... B60R 16/03 307/10.1
2019/0043276 A1* 2/2019 Conell ................ F02N 11/0862

OTHER PUBLICATIONS

Kowalyk, Pat, "Eliminate the 12V battery and increase EV performance," Vicor Corporation, 2025, retrieved from the internet on Nov. 20, 2025, <https://www.vicorpower.com/resource-library/articles/eliminate-the-12v-battery>.

* cited by examiner

*Primary Examiner* — Daniel Kessie
(74) *Attorney, Agent, or Firm* — Honigman LLP; Matthew H. Szalach

(57) ABSTRACT

A power distribution system for a vehicle includes power grids including a first power grid having a first polarity and a second power grid having a second polarity opposite to the first polarity. Aggregators are coupled to the power sources and include a first low voltage grid and a second low voltage grid. At least one load is defined by the first low voltage grid and the second low voltage grid and includes one or more of a non-critical load and a critical load. A plurality of switches is coupled to the aggregators to define a load path for each of the plurality of loads. A controller is operably coupled to each of the power grids and the plurality of switches and is configured with a power distribution architecture that includes modes. Each mode is defined by selective operation of one or more of the plurality of switches.

20 Claims, 15 Drawing Sheets

10a, $28a_2$
50, 50a-n
40a
40b
30a, 32
30b, 34

10a, $28a_4$
50, 50a-n
40b
30a, 32
22b
30b, 34

10a, $28a_1$
50, 50a-n
40a
40b
30a, 32
22b
30b, 34
22a

10a, $28a_3$
50, 50a-n
30a, 32
30b, 34
22b
22a 10b, 28b1
50,
50a-n
30a, 32
40a
40b
30b, 34
22a
60b
60d
22b 10b, 28b2

10b, 28b3

10b, 28b4

10b, 28b5

POWER DISTRIBUTION SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a power distribution system for a vehicle.

Vehicles operate under various loads, some of which run on a low voltage system. Over time, the loads operating on the low voltage system may continually increase in power demand. A common solution is to increase the voltage of the low voltage system to accommodate the increased power demand. For example, a low voltage system may operate at twelve (12) volts (V) and may be increased to forty-eight (48) volts (V). While the increase in voltage may be effective in improving the overall battery life, there may be an overall distribution loss in the low voltage system or a resultant redundancy for high power accessory loads. Thus, there is a need for an improved power management system that improves the power distribution loss of the low voltage system.

SUMMARY

In some aspects, a power distribution system for a vehicle includes at least two power grids including a first power grid and a second power grid. The first power grid has a first polarity, and the second power grid has a second polarity. The second polarity is opposite to the first polarity. At least two aggregators are coupled to the at least two power grids and include a first low voltage grid and a second low voltage grid. At least one load is defined by the first low voltage grid and the second low voltage grid. The at least one load includes one or more of a non-critical load and a critical load. A plurality of switches is coupled to the at least two aggregators to define a load path for each of the plurality of loads. A controller is operably coupled to each of the at least two power grids and the plurality of switches. The controller is configured with a power distribution architecture that includes modes. Each mode is defined by selective operation of one or more of the plurality of switches.

In some examples, the plurality of switches may include at least a first switch, a second switch, a third switch, and a fourth switch. Each of the plurality of switches may be operable between an open state and a closed state across a critical load. Optionally, the switches may be configured in an open circuit state. In some instances, the switches may be configured to apply a positive voltage across a load from a single power converter with respect to the chassis ground. The power distribution system may also include at least two converters. The switches may be configured to apply a higher positive voltage across a load by configuring the at least two converters in series. The power distribution system may also include at least two power sources connected to a respective one of the at least two aggregators with at least one switch. The at least two power sources may be arranged in series.

In another aspect, a power distribution system for a vehicle includes at least two power sources and one or more aggregators coupled to the at least two power sources and including a first low voltage grid and a second low voltage grid. At least one load is defined by the first low voltage grid and the second low voltage grid. The at least one load includes one or more of a non-critical load and a critical load. The power distribution system also includes a first converter coupled to the first low voltage grid and a second converter coupled to the second low voltage grid. A plurality of switches are coupled to each of the at least two power sources, the one or more aggregators, the first converter, and the second converter to define a load path for the at least one load. A controller is operably coupled to each of the at least two power sources, the one or more aggregators, the first converter, the second converter, and the plurality of switches. The controller is configured with a power distribution architecture including modes. Each mode is defined by selective operation of one or more of the plurality of switches.

In some examples, the power distribution architecture may be configured to determine an operating voltage for the at least one load during each of the modes. Optionally, the first converter may have a first polarity and the second converter may have a second polarity opposite from the first polarity. In some instances, the plurality of switches may be positioned at the at least one load. In some configurations, the plurality of switches may be positioned at the one or more aggregators. Optionally, the at least two power sources may be arranged in parallel.

In another aspect, a power distribution system for a vehicle includes a chassis ground and at least two power sources. A first converter is coupled to at least one power source of the at least two power sources. The first converter includes a first sub-converter and a second sub-converter and a negative port isolated from the chassis ground to define a secondary ground. A second converter is coupled to at least one power source of the at least two power sources. The second converter includes a third sub-converter and a fourth sub-converter. One or more buses are coupled to the first converter and the second converter. The one or more buses include a first bus and a second bus. A first supplementary switch is coupled to and between the first bus and the second bus, a second supplementary switch is coupled to and between the secondary ground and the second bus, and a third supplementary switch is coupled to and between the secondary ground and the chassis ground. A controller is operably coupled to each of the at least two power sources, the first converter, the second converter, and each of the first, second, and third supplementary switches. The controller is configured with a power distribution architecture including modes.

The power distribution system may include a critical load and a plurality of non-critical loads. The plurality of non-critical loads may include a first non-critical load and a second non-critical load, and the first non-critical load may be defined between the first bus and the secondary ground via a first disconnect switch and the second non-critical load may be defined between the second bus and the chassis ground by a second disconnect switch. Optionally, the one or more buses may include a third bus and a fourth bus, and the first and second sub-converters of the first converter may be coupled to the third bus and the third and fourth sub-converters of the second converter may be coupled to the fourth bus. In some instances, at least one of the plurality of non-critical loads may be connected across one of the third bus and the fourth bus and the chassis ground through a switch. In some examples, the first converter includes a positive output and a negative output, the positive output may be coupled to the third bus through a switch and the negative output may be coupled to the chassis ground.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
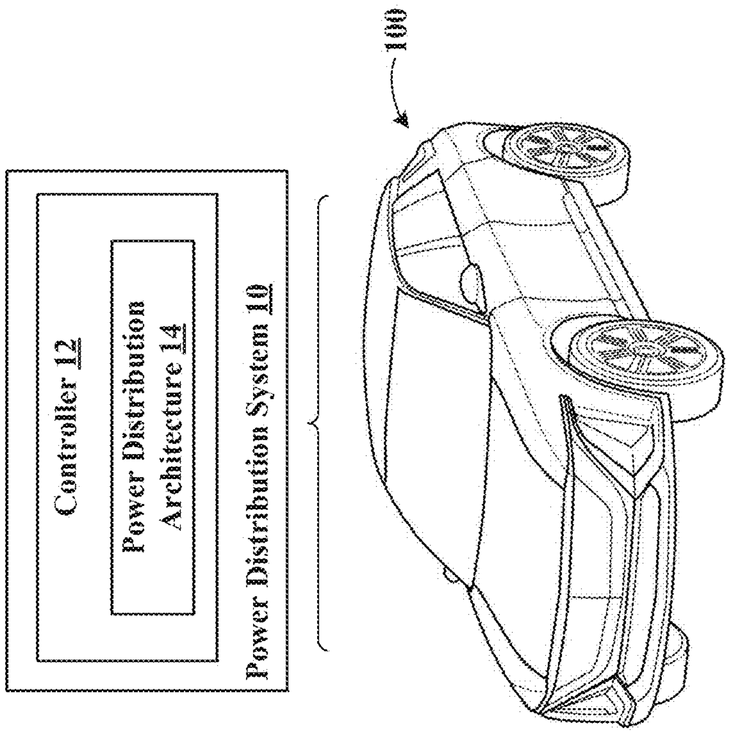
FIG. 1 is a schematic of a vehicle equipped with a power distribution system according to the present disclosure.
Figure 2:
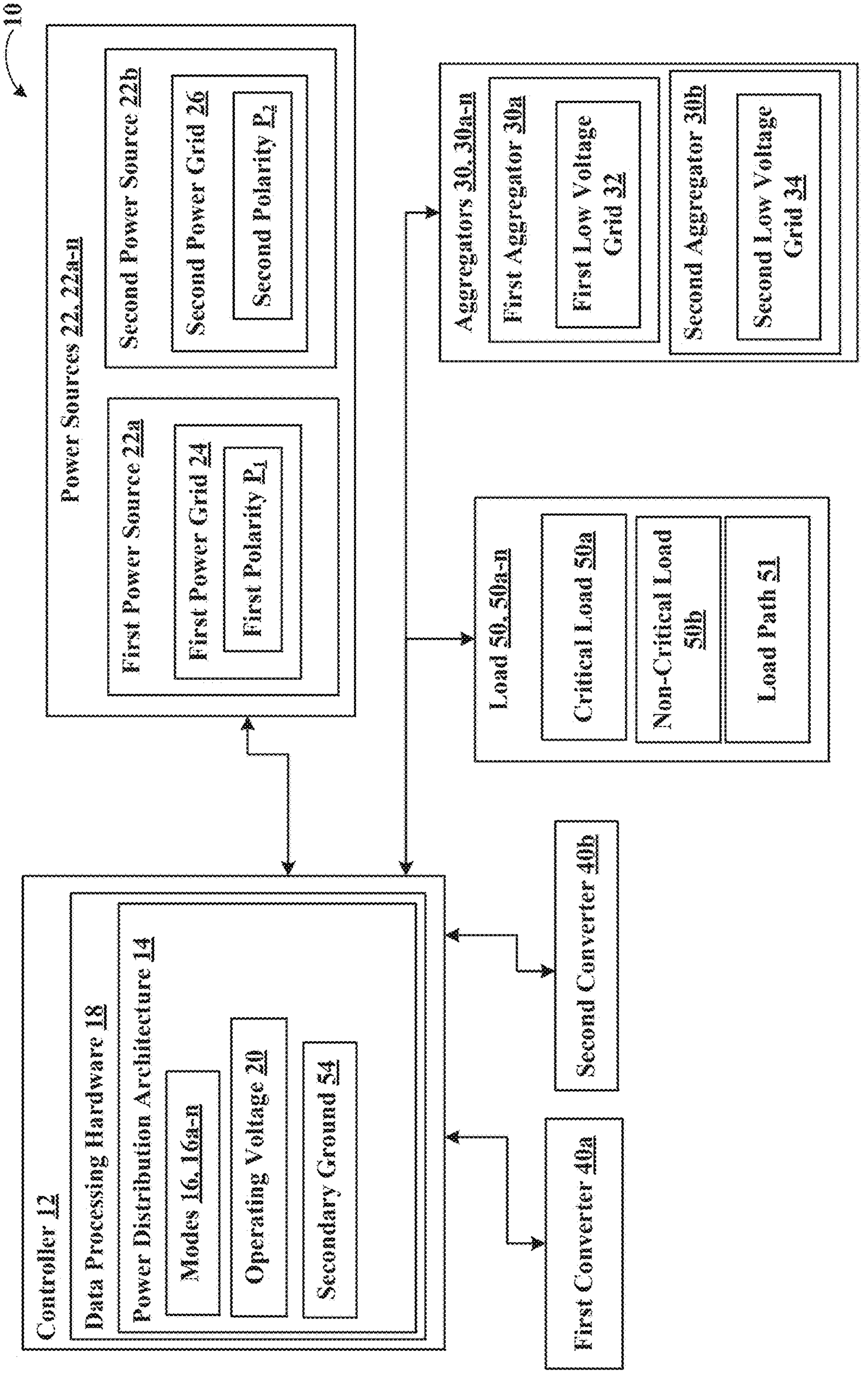
FIG. 2 is an example block diagram of a power distribution system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a power distribution system 10 for a vehicle 100 is configured to control the change in voltage for the vehicle 100. For example, the vehicle 100 may require an increase in voltage, which is executed by the power distribution system 10. The power distribution system 10 is controlled by a controller 12 of the vehicle 100, which is configured to execute a power distribution architecture 14. The power distribution architecture 14 is configured to execute various modes 16, 16*a-n* of the power distribution system 10, described in more detail below. The power distribution architecture is also configured to determine an operating voltage 20 during each of the modes 16, 16*a-n*. The controller 12 also includes data processing hardware 18 configured to execute the power distribution architecture 14.

The power distribution system 10 includes at least two power sources 22, 22*a-n* that includes a first power grid 24 and a second power grid 26. The first power grid 24 and the second power grid 26 have opposing polarities P. For example, the first power grid 24 has a first polarity $P_1$ and the second power grid 26 has a second polarity $P_2$ that is opposite to the first polarity $P_1$. The power sources 22, 22*a-n* may be any practicable power source 22, 22*a-n* utilized by the vehicle 100. In one non-limiting example, the power sources 22, 22*a-n* may be a battery 22, 22*a-n*. The power sources 22, 22*a-n* are coupled to aggregators 30, 30*a-n* that are separated into a first low voltage grid 32 and a second low voltage grid 34. For example, a first power source 22*a* may be coupled to the first low voltage grid 32 of a first aggregator 30*a* and a second power source 22*b* may be coupled to the second low voltage grid 34 of a second aggregator 30*b*.

With further reference to FIGS. 1-4, the aggregators 30, 30*a-n* are further coupled to a pair of converters 40*a*, 40*b* to create a bipolar voltage for distribution. The converters 40*a*, 40*b* may be direct current (DC) converters 40*a*, 40*b*, also known as DC/DC converters 40*a*, 40*b*. The converters 40*a*, 40*b* are configured to convert power from a high voltage system (i.e., the power sources 22, 22*a-n*) to reduce the voltage. For example, if the voltage from the high voltage system is 400 volts (V), the converters 40*a*, 40*b* may convert or reduce the voltage to twelve (12) V or some other practicable reduced voltage. The combination of the converters 40*a*, 40*b* with the aggregators 30, 30*a-n* allow for a reduction of distribution power loss by four times. In some examples, a first converter 40*a* may be coupled to the first low voltage grid 32 of the first aggregator 30*a*, and a second converter 40*b* may be coupled to the second low voltage grid 34 of the second aggregator 30*b*. The power distribution system 10 further defines at least one load 50, 50*a-n* across the first low voltage grid 32 and the second low voltage grid 34. For example, the load 50 may include, but is not limited to, a critical load 50*a* and a non-critical load 50*b*. In some instances, the load 50 may also include a high current load and a high integrity load. The load 50 is distributed across the aggregators 30, 30*a-n* and the converters 40*a*, 40*b*, such that a load path 51 is defined for the load across at least the first converter 40*a* and the second converter 40*b*.

Figure 3:
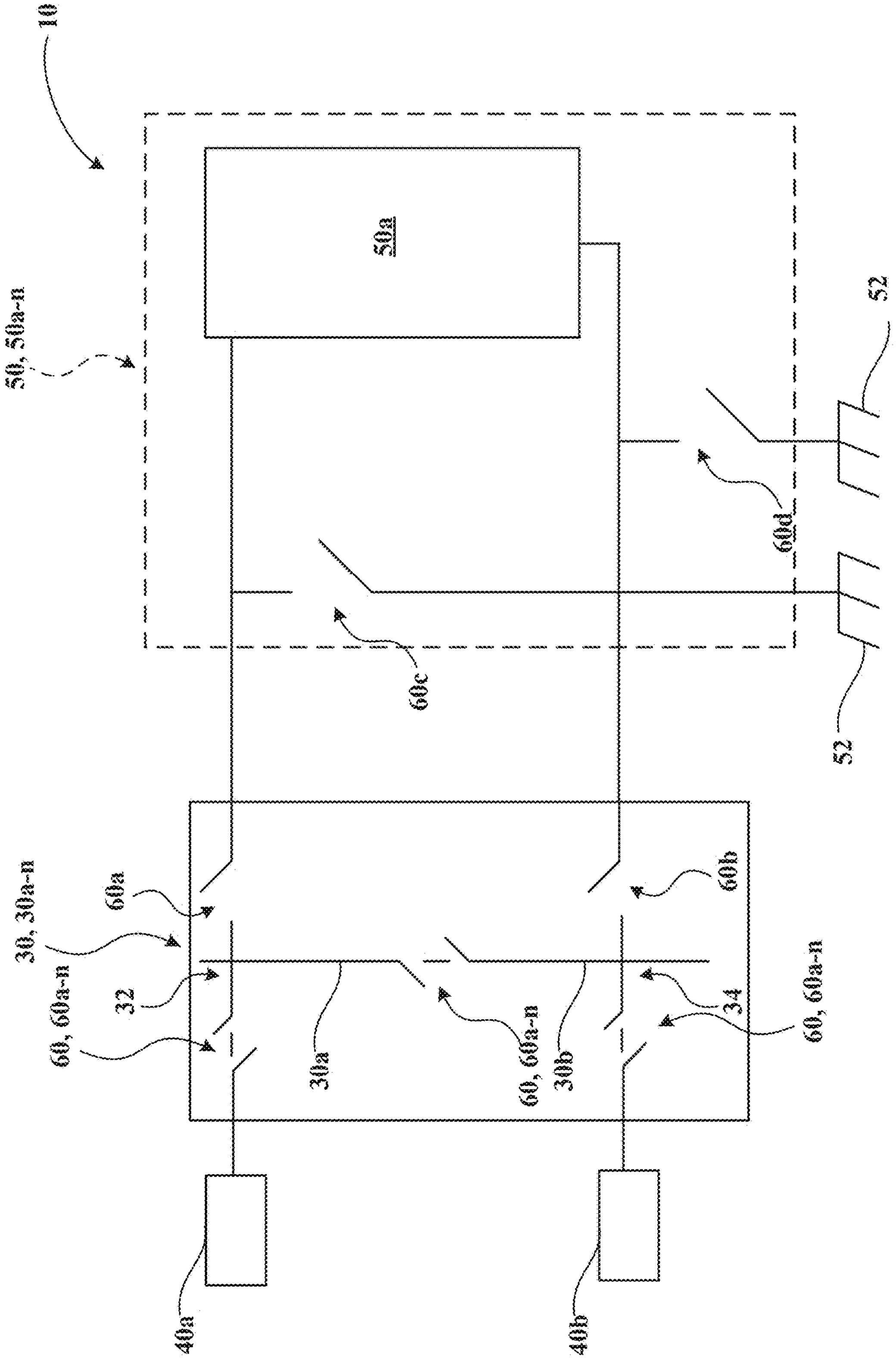
FIG. 3 is a schematic diagram of a power distribution system according to the present disclosure.
Figure 4:
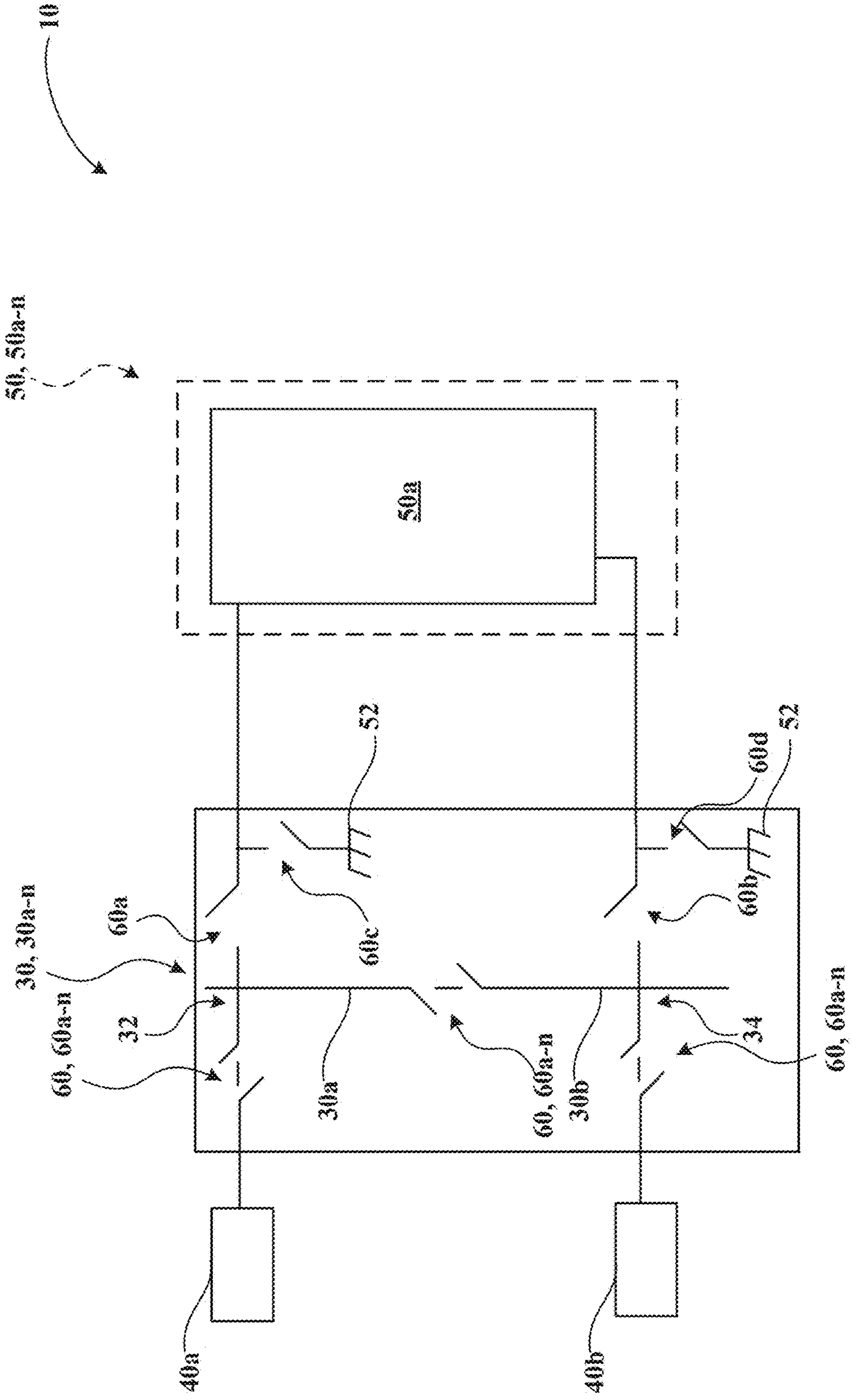
FIG. 4 is another schematic diagram of a power distribution system according to the present disclosure.
Figure 5:
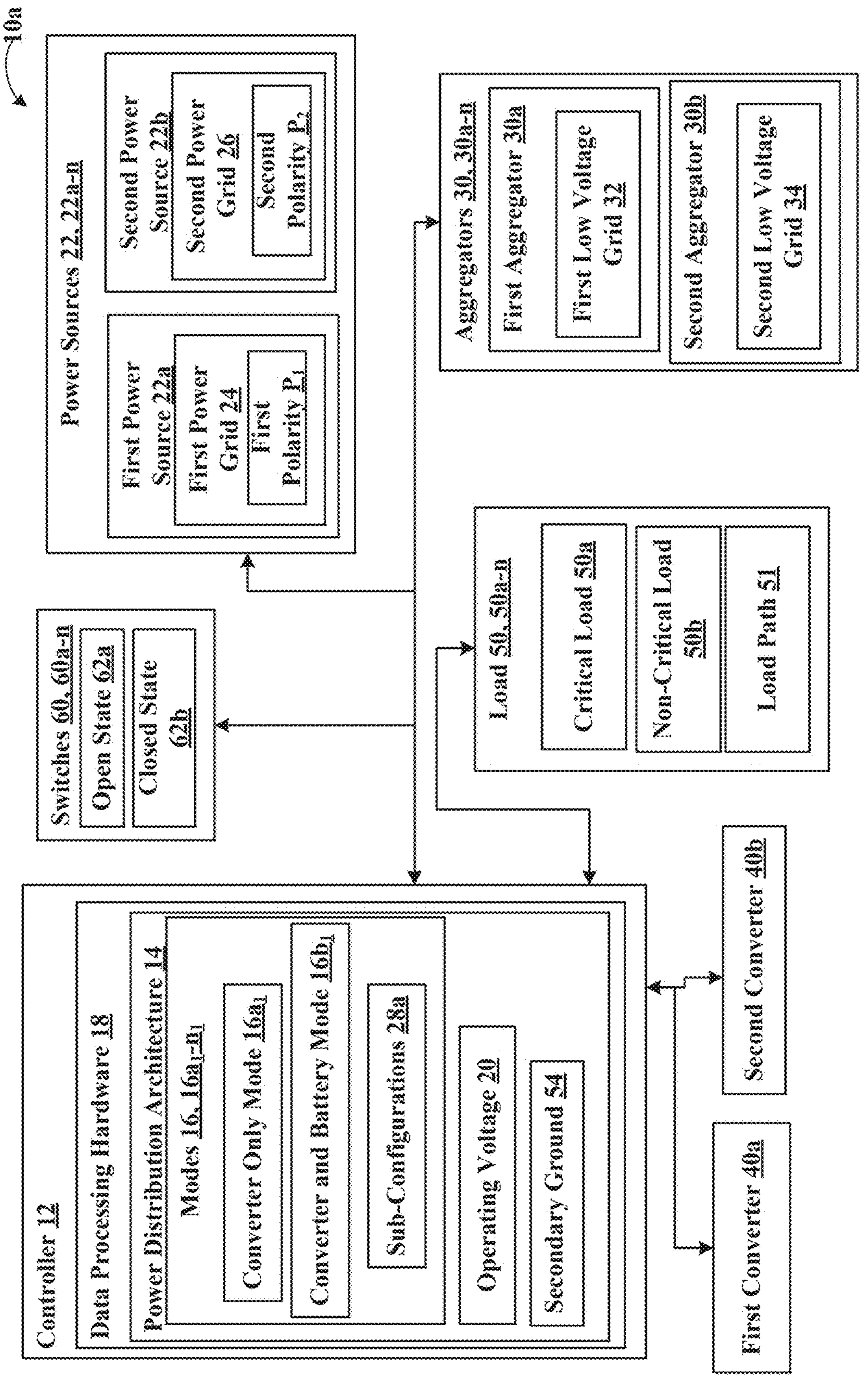
FIG. 5 is another exemplary block diagram of a power distribution system according to the present disclosure.
Figure 6:
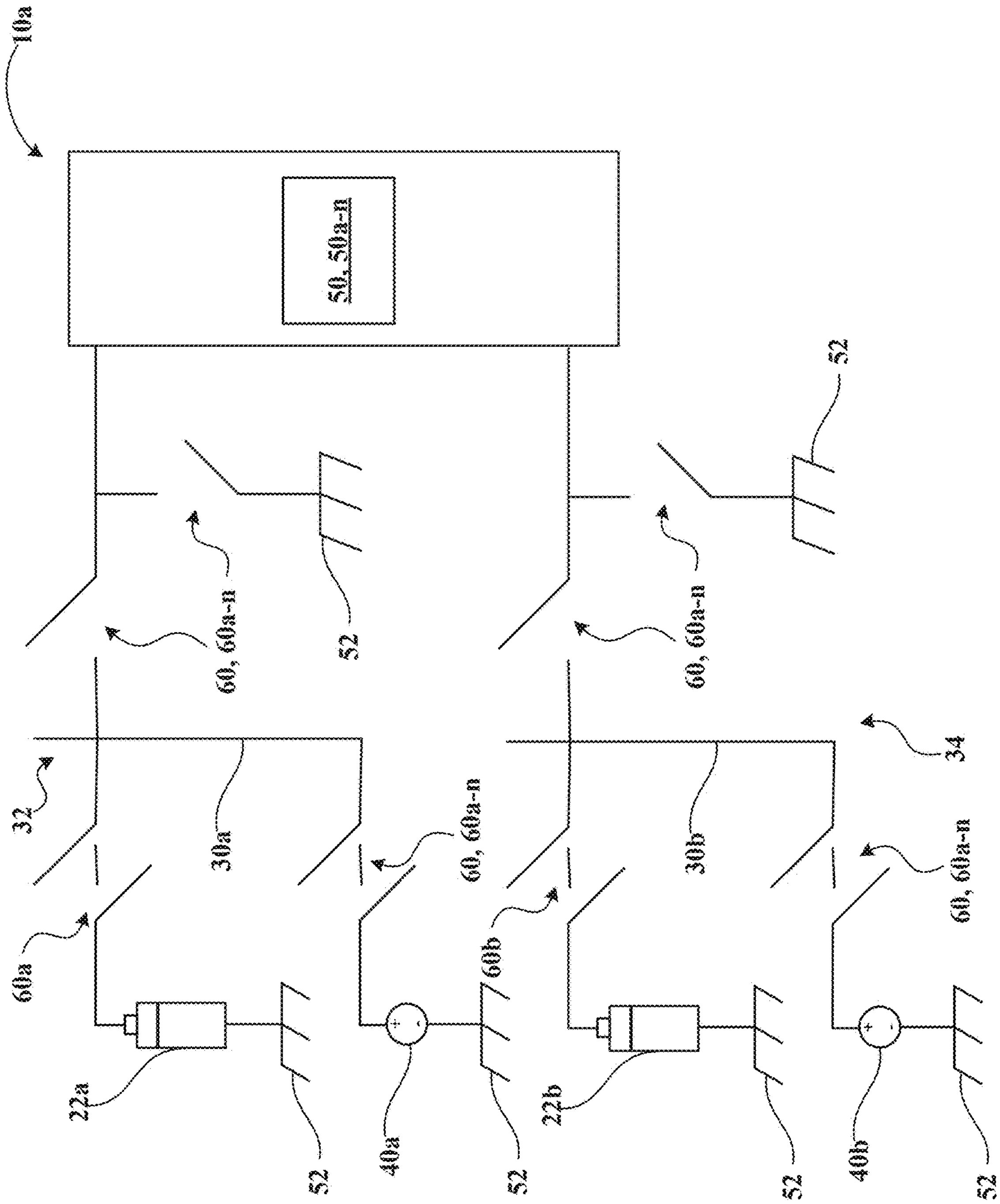
FIG. 6 is an exemplary schematic diagram of a power distribution system according to the present disclosure.

The power distribution system 10 further includes a plurality of switches 60, 60*a-n* that are integrated with at least one of the aggregators 30, 30*a-n* and the load 50, 50*a-n*. For example, FIG. 3 illustrates one example where a first switch 60*a* and a second switch 60*b* are integrated with the aggregators 30, 30*a-n* and a third switch 60*c* and a fourth switch 60*d* are integrated with the load 50, 50*a-n*. In another example, illustrated in FIG. 4, the switches 60, 60*a-n* are each integrated with the aggregators 30, 30*a-n*. The power distribution system 10 generally utilizes four (4) switches 60, 60*a-n* in various configurations to execute the modes 16, 16*a-n*, described herein. With respect to a critical load 50*a*, the switches 60, 60*a-n* may control which power source 22, 22*a-n* provides power to the critical load 50*a*, such that the switches 60, 60*a-n* at the critical load 50*a* may control whether power will come from the first converter 40*a* or the second converter 40*b*.

As mentioned above, the converters 40*a*, 40*b* have opposing polarities P. By reversing the polarity P of one of the converters 40*a*, 40*b*, a voltage distribution (i.e., power) across the two converters may be doubled. For example, the converters 40*a*, 40*b* effectively increase or decrease the amount of voltage that is available for the load 50, 50*a-n*. In one example, the load 50, 50*a-n* connected to the first converter 40*a* may operate at a positive voltage with respect to a chassis ground 52 and the other loads 50, 50*a-n* connected to the second converter 40*b* will operate at a negative voltage with respect to the chassis ground 52. In some instances, high current loads 50 connect to the combined grids 32, 34 without direct connection to the chassis ground 52. Comparatively, loads 50 that have high integrity connect to the combined grids 32, 34 and have a secondary switched path directly to the chassis ground 52. For example, a load 50 utilizing high integrity may be configured to operate in a reduced performance mode 16, 16*a-n* with voltage from a single grid 32, 34 or reduced voltage in the combined grids 32, 34. Ultimately, the voltage can be halved or doubled without modifying wiring of the power distribution system 10 because of the opposing polarities P.

The power distribution system 10 is configured to have one of the power sources 22, 22*a-n* operate in the upper or negative potential. Also, for each load 50, 50*a-n*, the power distribution system 10 is equipped with four (4) switches 60, 60*a-n* to determine which voltage to apply across the load 50, 50*a-n*. As mentioned above, the power distribution architecture 14 is configured to execute various modes 16, 16*a-n* of the power distribution system 10. The modes 16, 16*a-n* are defined by a state 62 of the switches 60, 60*a-n*. For example, the states 62 may include an open state 62*a* and a closed state 62*b*. The power distribution architecture 14 is configured to restrict the switches 60, 60*a-n* on the same grid 34, 36 from being in the closed state 62*b* at the same time. For example, a first switch 60*a* and a third switch 60*c* positioned on the first low voltage grid 34 cannot both be in the closed state 62*b*. However, a first switch 60*a* on the first low voltage grid 34 and a second switch 60*b* on the second low voltage grid 36 may be in the closed state 62*b* at the same time, as described in more detail below. The transition time of the state 62 of the switches 60, 60*a-n* may be determined by a load capacitance. The modes 16, 16*a-n* are dependent on the state 62 at each respective switch 60, 60*a-n*, such that the modes 16, 16*a-n* differ depending on which ones of the switches 60, 60*a-n* are in the open state 62*a* and which are in the closed state 62*b*.

If all the switches 60, 60*a-n* are in the open state 62*a*, then the mode 16, 16*a-n* of the power distribution system 10 is defined as a first, open circuit mode 16*a*. A second mode 16*b* may be defined with the first switch 60*a* and the second switch 60*b* being in the closed state 62*b* and the third switch 60*c* and the fourth switch 60*d* being in the open state 62*a*. A third mode 16*c* may be defined with the first switch 60*a* and the fourth switch 60*d* in the open state 62*a* and the second switch 60*b* and the third switch 60*c* in the closed state 62*b*. A fourth mode 16*d* may be defined with the second switch 60*b* and the third switch 60*c* in the open state 62*a* and the first switch 60*a* and the fourth switch 60*d* in the closed state 62*b*. The controller 12 is configured to determine, via the power distribution architecture 14, an optimum operating voltage for each critical load 50*a* at various modes 16, 16*a-n* and communicate with the aggregators 30, 30*a-n* to turn on or off specific switches 60, 60*a-n* to the critical load 50*a*. The switches 60, 60*a-n* associated with the critical loads can detect arc and disconnect the load 50 in response to an arcing event.

The power distribution system 10 is configured to have multiple power sources 22, 22*a-n* in combination with the converters 40*a*, 40*b* and two aggregators 30*a*, 30*b*. At the loss of the power sources 22, 22*a-n* (i.e., batteries), the load 50 is connected across at least one of the converters 40*a*, 40*b*. If two of the power sources 22, 22*a-n* (i.e., two batteries) are experiencing a fault, then the two converters 40*a*, 40*b* are effectively in series across the load 50 and may serve as a power source. If a single power source 22, 22*a-n* (i.e., a single battery) is experiencing a fault, the converters 40*a*, 40*b* are effectively in series across the load 50 and a single power source 22, 22*a-n* (i.e., single battery) is in parallel with one of the converters 40*a*, 40*b*. In another example, if a single power source 22, 22*a-n* (i.e., single battery) and a single converter 40*a*, 40*b* are experiencing a fault, then the critical load 50*a* is connected across the other converter 40*a*, 40*b* and the remaining power source 22, 22*a-n* (i.e., remaining battery) in parallel.

With specific reference to FIGS. 5-7G, a power distribution system 10*a* is provided. In view of the substantial similarity in structure and function of the components associated with the power distribution system 10, like reference numerals are used hereinafter and in the drawings to identify like components, while like reference numerals containing letter and number extensions are used to identify those components that have been modified.

The power distribution system 10a is illustrated with a first power source 22a, a second power source 22b, a first aggregator 30a, a second aggregator 30b, a first converter 40a, and a second converter 40b. A load 50, 50a-n is coupled to the first and second aggregators 30a, 30b through a series of switches 60, 60a-n. A power distribution architecture 14a is configured to execute the modes 16, $16a_1$-$n_1$ of the power distribution system 10a. For example, the modes 16, $16a_1$-$n_1$ may include a converter only mode $16a_1$ and a converter and battery mode $16b_1$. The modes 16, $16a_1$-$n_1$ may also include sub-configurations 28a, $28a_{1-n}$ that are defined by which components of the power distribution system 10a are activated by the power distribution architecture 14a. Further, the arrangement of the aggregators 30a, 30b and the power sources 22a, 22b influences the voltage distribution across the power distribution system 10a. For example, the converters 40a, 40b may be in series with the power sources 22a, 22b across the load 50, 50a-n.

Figure 7B:
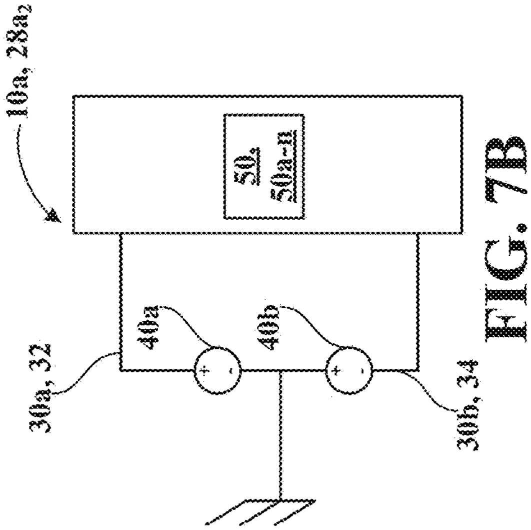
FIGS. 7A-7G are exemplary schematic diagrams of various modes of the power distribution system of FIG. 5.
Figure 7D:
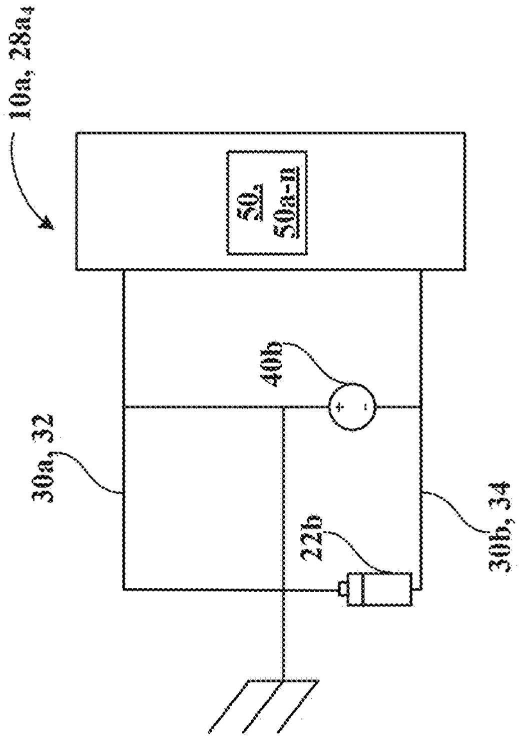
Figure 7A:
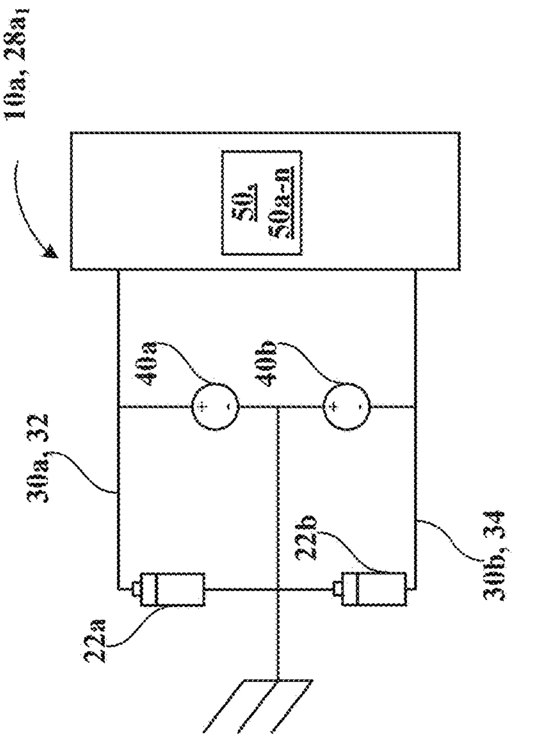
Figure 7C:
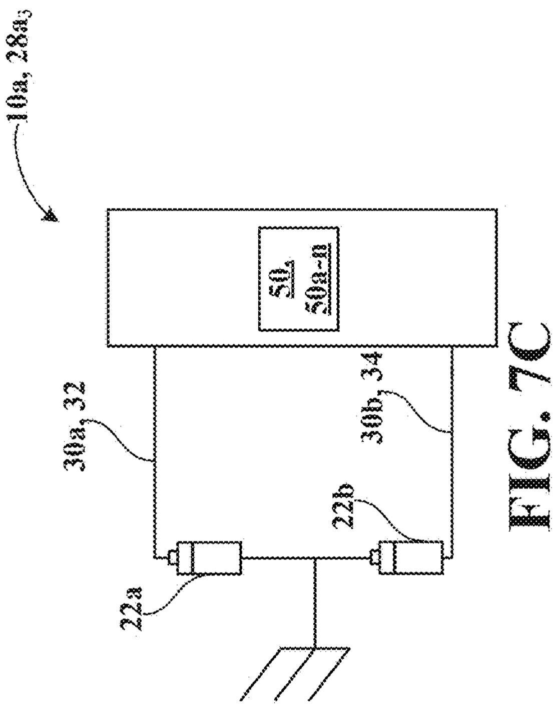
Figure 7F:
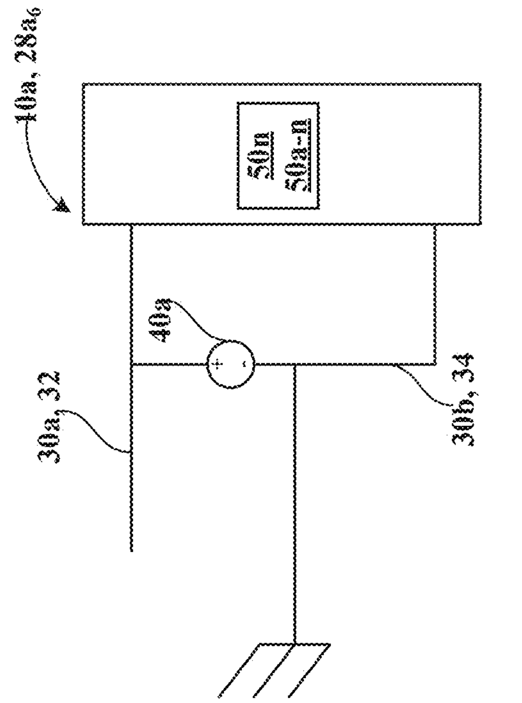
Figure 7E:
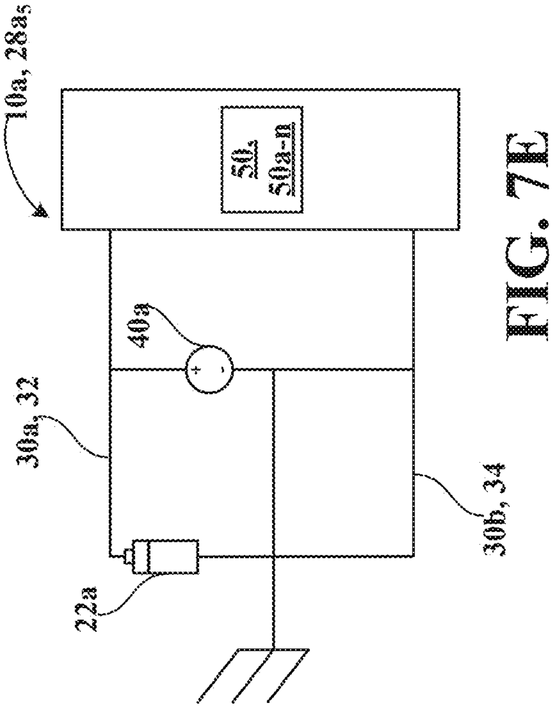
Figure 7G:
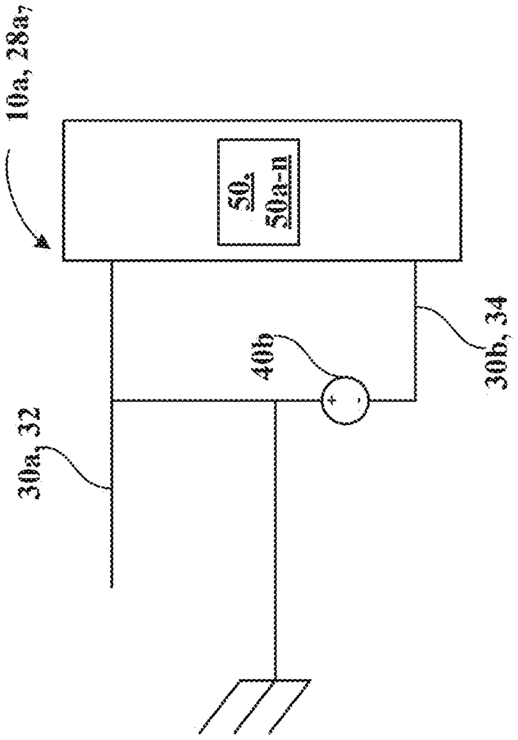
Figure 8:
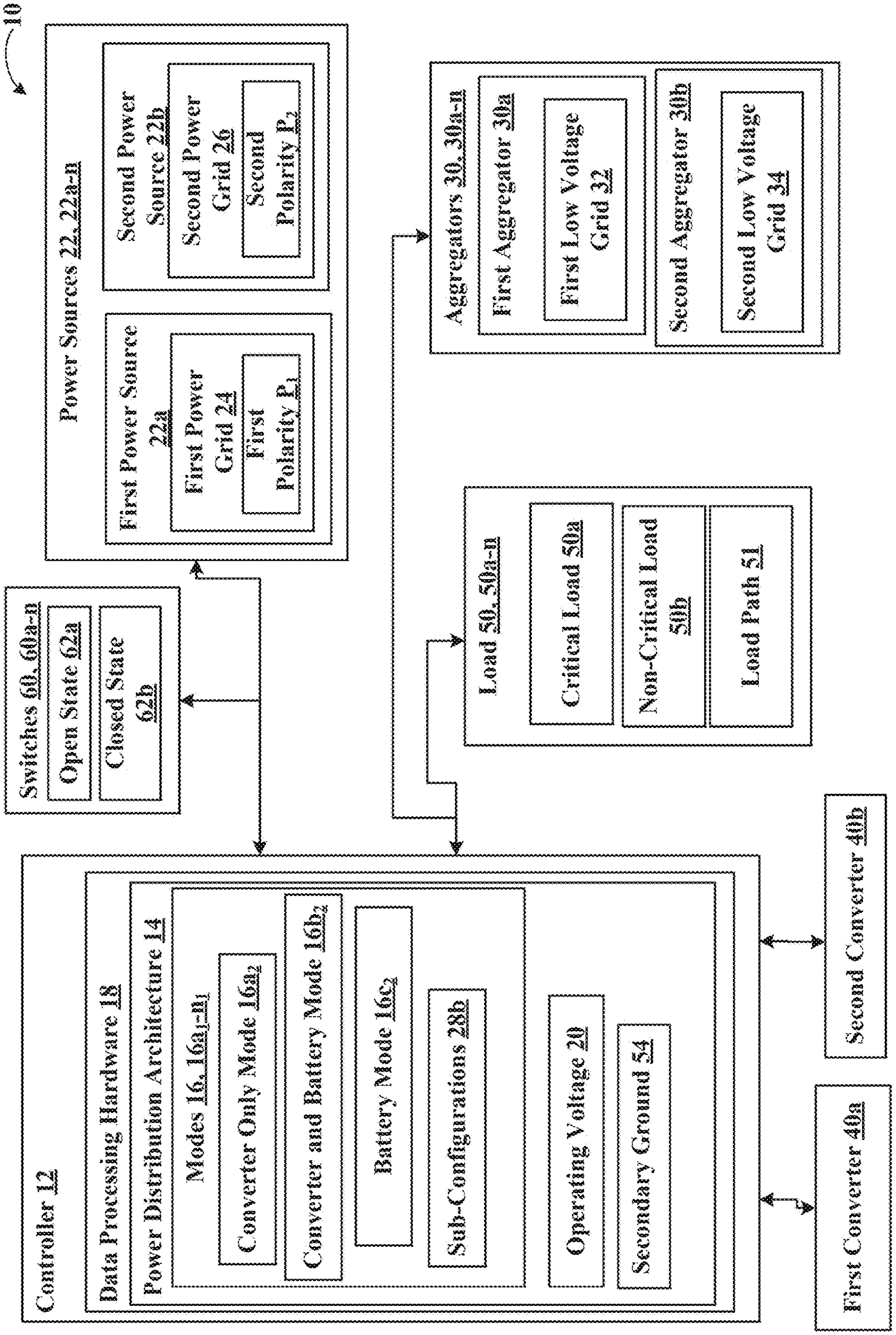
FIG. 8 is yet another exemplary block diagram of a power distribution system according to the present disclosure.
Figure 9:
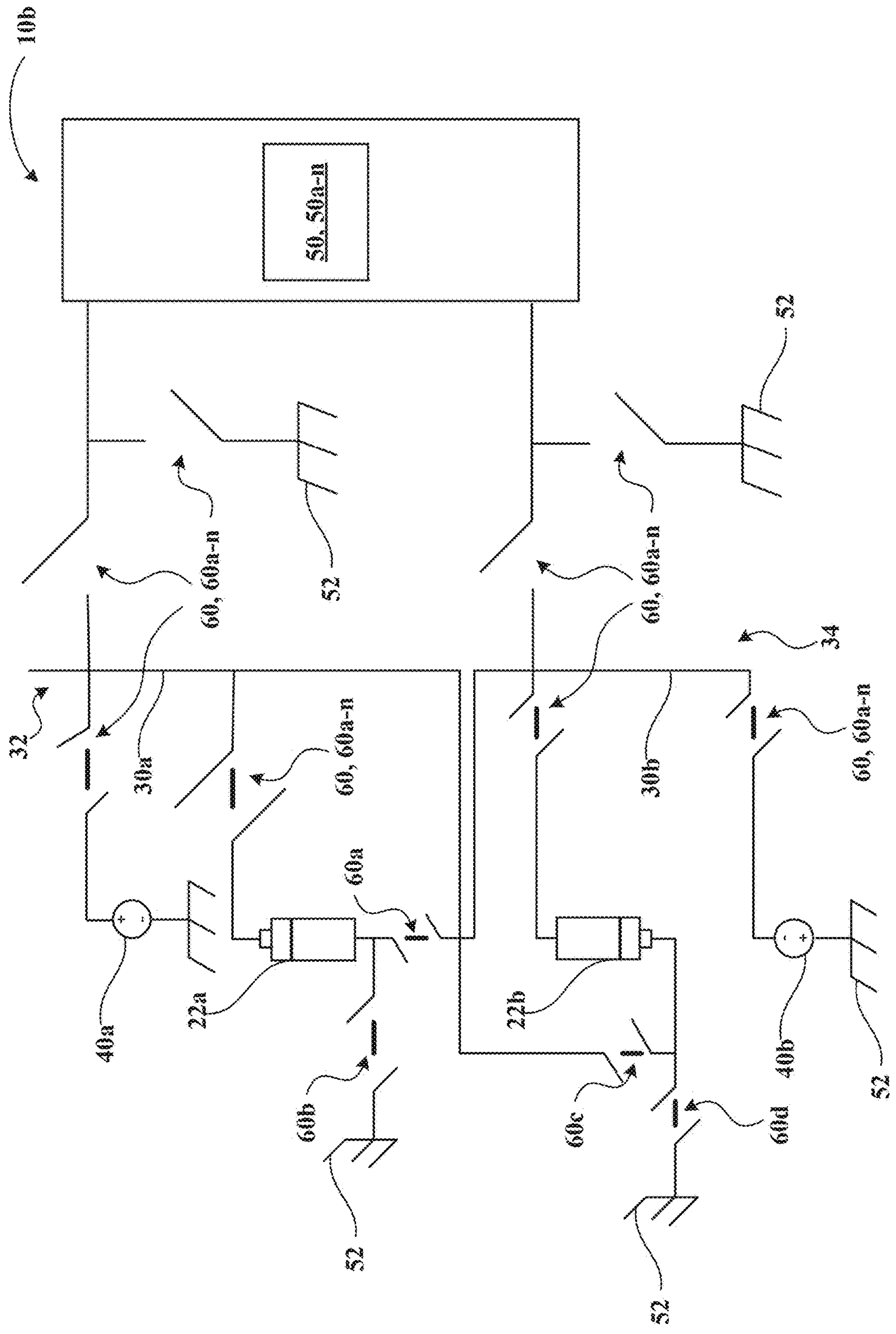
FIG. 9 is another exemplary schematic diagram of a power distribution system according to the present disclosure.

FIGS. 7A-7G illustrate exemplary sub-configurations 28a, $28a_{1-n}$ of the modes 16 $16a_1$-$n_1$ that may be executed by the power distribution architecture 14a opening or closing respective switches 60, 60a-n. For example, FIG. 7A illustrates a sub-configuration $28a_1$ where all the switches 60, 60a-n are in the open state 62a with the power sources 22a, 22b operating in series. FIG. 7B illustrates a sub-configuration $28a_2$ where the switches 60, 60a-n at the power sources 22a, 22b are in the closed state 62b and the switches 60, 60a-n at the converters 40a, 40b are in the open state 62a. FIG. 7C illustrates a sub-configuration $28a_3$ where the switches 60, 60a-n at the power sources 22a, 22b are in the open state 62a and the switches 60, 60a-n at the converters 40a, 40b are in the closed state 62b. While the power sources 22a, 22b are active (i.e., the switches 60, 60a-n are in the open state 62a), the power sources 22a, 22b of the power distribution system 10a only operate in series relative to one another. FIG. 7D illustrates a sub-configuration $28a_4$ where the switches 60, 60a-n at the second power source 22b and the second converter 40b are in the open state 62a and the switches 60, 60a-n at the first power source 22a and the first converter 40a are in the closed state 62b. FIG. 7E illustrates a sub-configuration $28a_5$ where the switches 60, 60a-n at the first power source 22a and the first converter 40a are in the open state 62a and the switches 60, 60a-n at the second power source 22b and the second converter 40b are in the closed state 62b. FIG. 7F illustrates a sub-configuration $28a_6$ where the switch 60, 60a-n at the first converter 40a is in the open state 62a and the switches 60, 60a-n at the first power source 22a, the second power source 22b, and the second converter 40b are in the closed state 62b. FIG. 7G illustrates a sub-configuration $28a_7$ where the switch 60, 60a-n at the second converter 40b is in the open state 62a and the switches 60, 60a-n at the first power source 22a, the second power source, and the first converter 40a are in the closed state 62b.

With specific reference to FIGS. 8-10G, a power distribution system 10b is provided. In view of the substantial similarity in structure and function of the components associated with the power distribution system 10, like reference numerals are used hereinafter and in the drawings to identify like components, while like reference numerals containing letter and number extensions are used to identify those components that have been modified.

The power distribution system 10b is illustrated with a first power source 22a, a second power source 22b, a first aggregator 30a, a second aggregator 30b, a first converter 40a, and a second converter 40b. A load 50, 50a-n is coupled to the first and second aggregators 30a, 30b through a series of switches 60, 60a-n. A power distribution architecture 14b is configured to execute the modes 16, $16a_2$-$n_2$ of the power distribution system 10a. For example, the modes 16, $16a_2$-$n_2$ may include a converter only mode $16a_2$, a converter and battery mode $16b_2$, and a battery mode $16c_2$. The battery mode $16c_2$ of the power distribution architecture 14b provides the ability for the power sources 22a, 22b to operate in either series or parallel relative to one another.

For example, the power distribution system 10b may be configured with additional switches 60, 60a-n to facilitate the arrangement of the power sources 22a, 22b in parallel. In one non-limiting example, the power distribution system 10b may include an additional four (4) switches 60, 60a-n to accommodate the parallel arrangement of the power sources 22a, 22b. For each power source 22, 22a-n in parallel, four (4) switches 60, 60a-n may be added to the power distribution system 10b. The ability to arrange the power sources 22, 22a-n in parallel advantageously provides additional safety features and options for bailing operational power for the power distribution system 10b. The modes 16, $16a_2$-$n_2$ may also include sub-configurations 28b, $28b_{1-n}$ that are defined by which components of the power distribution system 10b are activated by the power distribution architecture 14b. Further, the arrangement of the aggregators 30a, 30b and the power sources 22a, 22b influences the voltage distribution across the power distribution system 10b. For example, the converters 40a, 40b may be in series with the power sources 22a, 22b across the load 50, 50a-n.

Figure 10A:
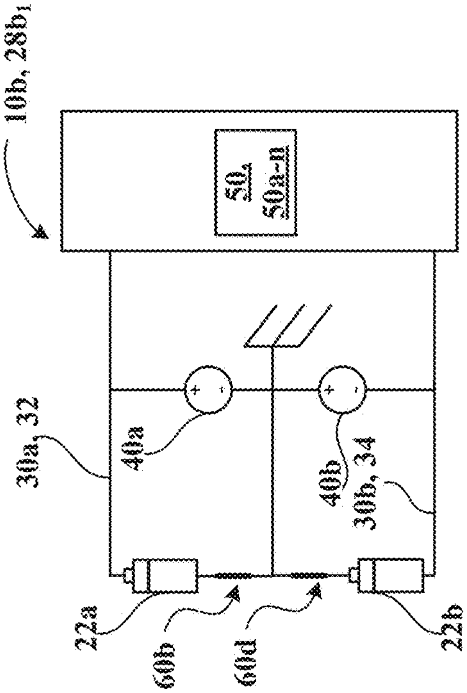
FIGS. 10A-10G are exemplary schematic diagrams of various modes of the power distribution system of FIG. 8.
Figure 10B:
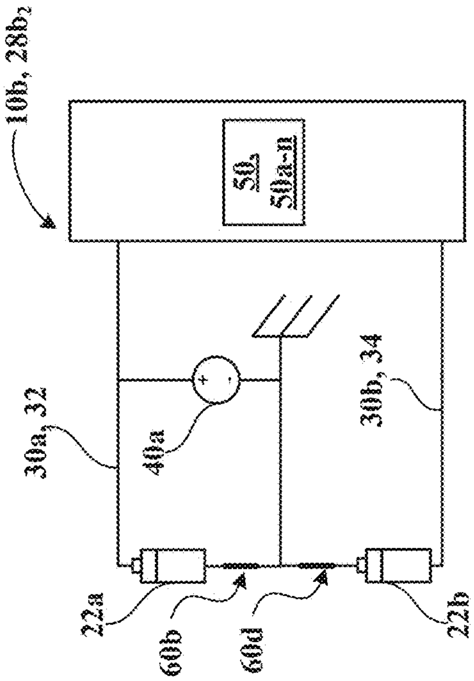
Figure 10C:
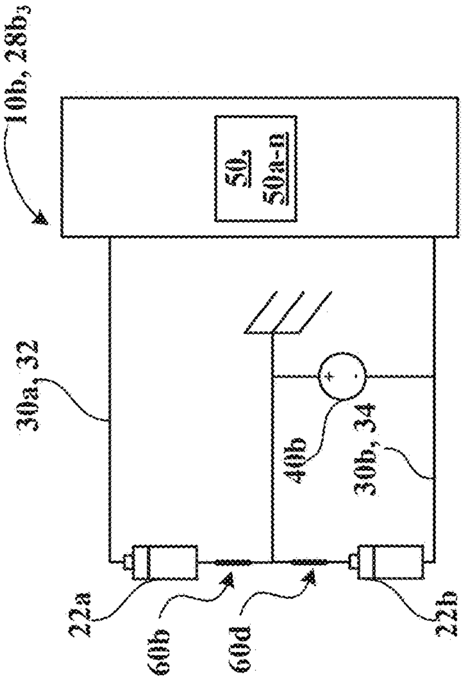
Figure 10D:
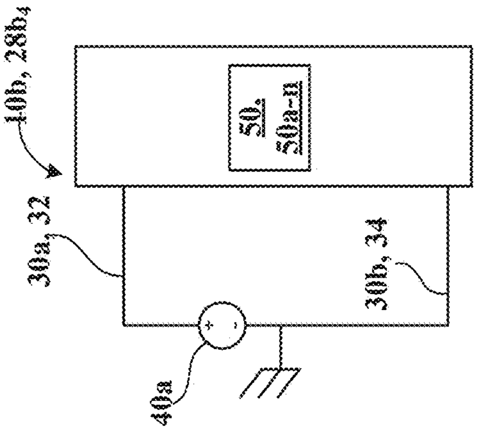
Figure 10E:
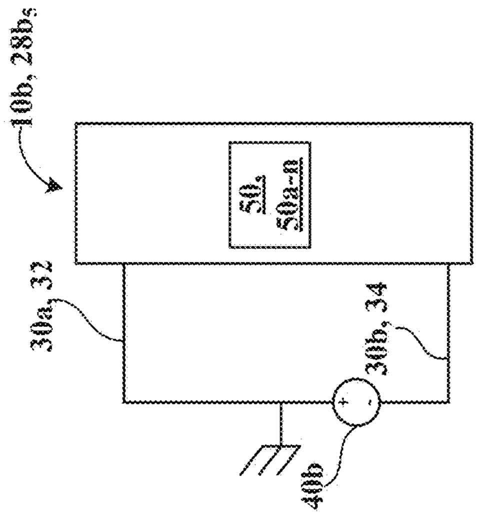
Figure 10G:
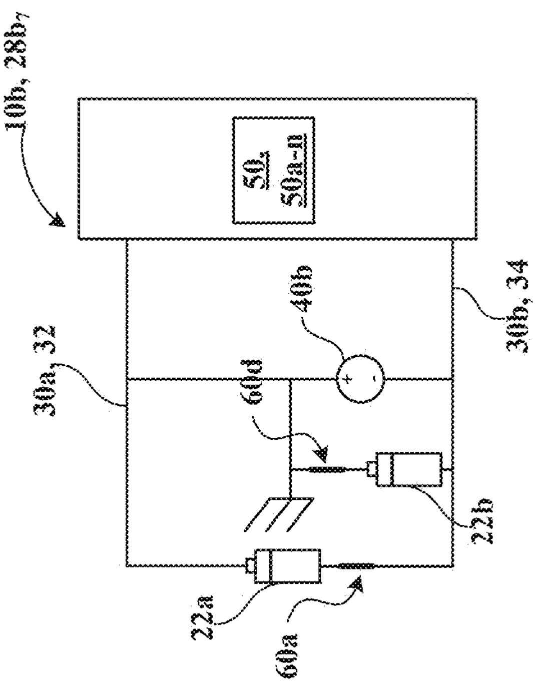
Figure 10F:
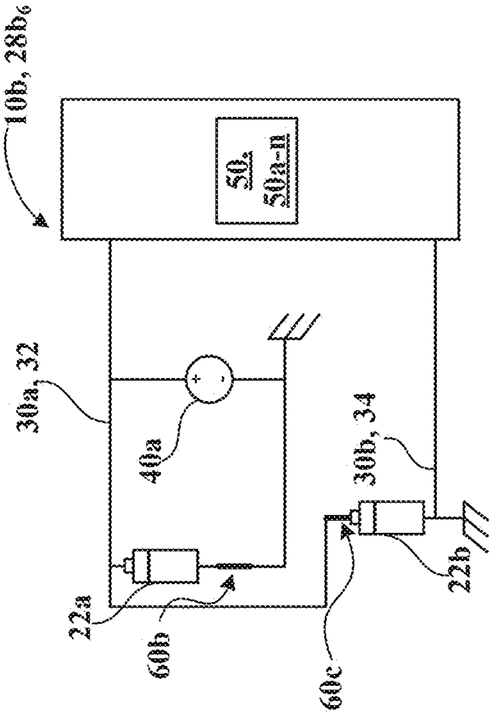

FIGS. 10A-10G illustrate exemplary sub-configurations 28b, $28b_{1-n}$ of the modes 16 $16a_2$-$n_2$ that may be executed by the power distribution architecture 14b opening or closing respective switches 60, 60a-n. For example, FIG. 10A illustrates a sub-configuration $28b_1$ where all the switches 60, 60a-n are in the open state 62a with the power sources 22a, 22b operating in series. FIG. 10B illustrates a sub-configuration $28b_2$ where the switches 60, 60a-n at the power sources 22a, 22b and the first converter 40a are in the open state 62a and the switch 60, 60a-n at the second converter 40b is in the open state 62a. In this configuration, the power sources 22a, 22b are operating in series. FIG. 10C illustrates a sub-configuration $28b_3$ where the switches 60, 60a-n at the power sources 22a, 22b and the second converter 40b are in the open state 62a and the switch 60, 60a-n at the first converter 40a is in the closed state 62b. In this configuration, the power sources 22a, 22b are operating in series. FIG. 10D illustrates a sub-configuration $28b_4$ where the switches 60, 60a-n at the power sources 22a, 22b and the second converter 40b are in the closed state 62b and the switch 60, 60a-n at the first converter 40a is in the open state 62a. FIG. 10E illustrates a sub-configuration $28b_5$ where the switches 60, 60a-n at the power sources 22a, 22b and the first converter 40a are in the closed state 62b and the switch 60, 60a-n at the second converter 40b is in the open state 62a. FIG. 10F illustrates a sub-configuration $28b_6$ where the switch 60, 60a-n at the second converter 40b is in the closed state 62b and the switches 60, 60a-n at the first power source 22a, the second power source 22b, and the first converter 40a are in the open state 62a. In this configuration, the power sources 22a, 22b are operating in parallel. FIG. 10G illustrates a sub-configuration $28b_7$ where the switch 60,

60$a$-$n$ at the first converter 40$a$ is in the closed state 62$b$ and the switches 60, 60$a$-$n$ at the first power source 22$a$, the second power source 22$b$, and the second converter 40$b$ are in the open state 62$a$. In this configuration, the power sources 22$a$, 22$b$ are operating in parallel.

Figure 11:
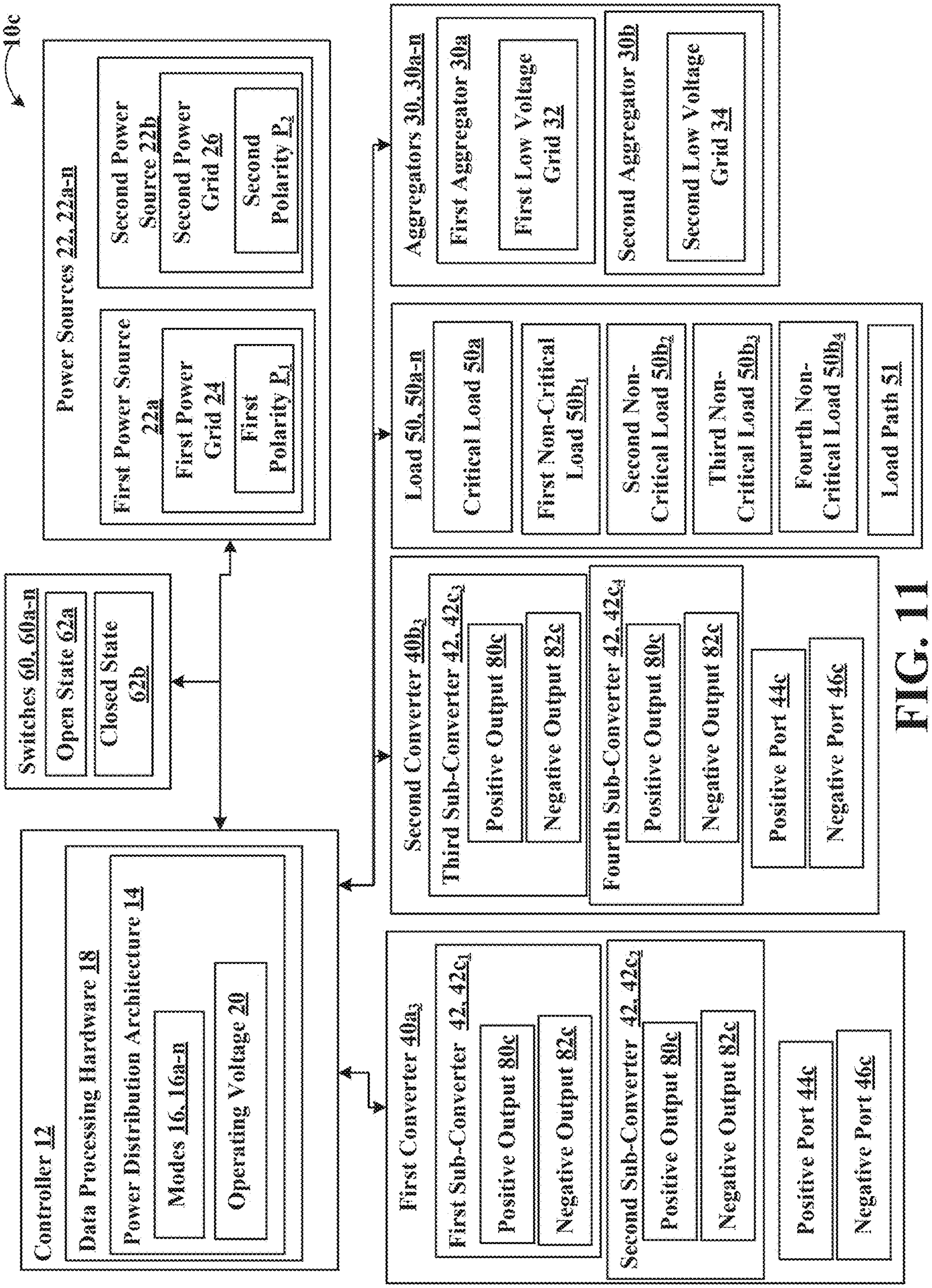
FIG. 11 is another exemplary block diagram of a power distribution system according to the present disclosure.
Figure 12:
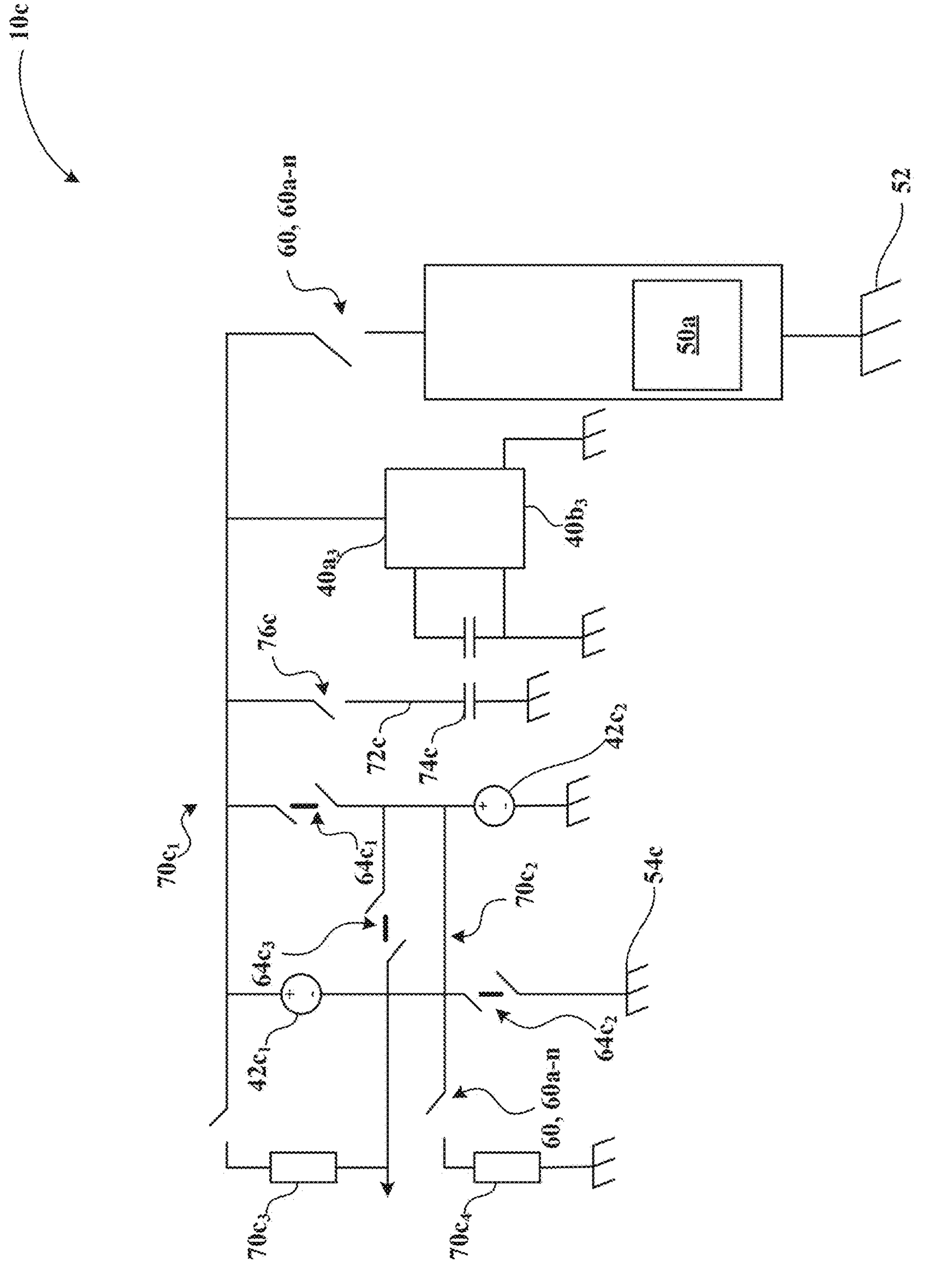
FIG. 12 is yet another exemplary schematic diagram of a power distribution system according to the present disclosure.
Figure 13:
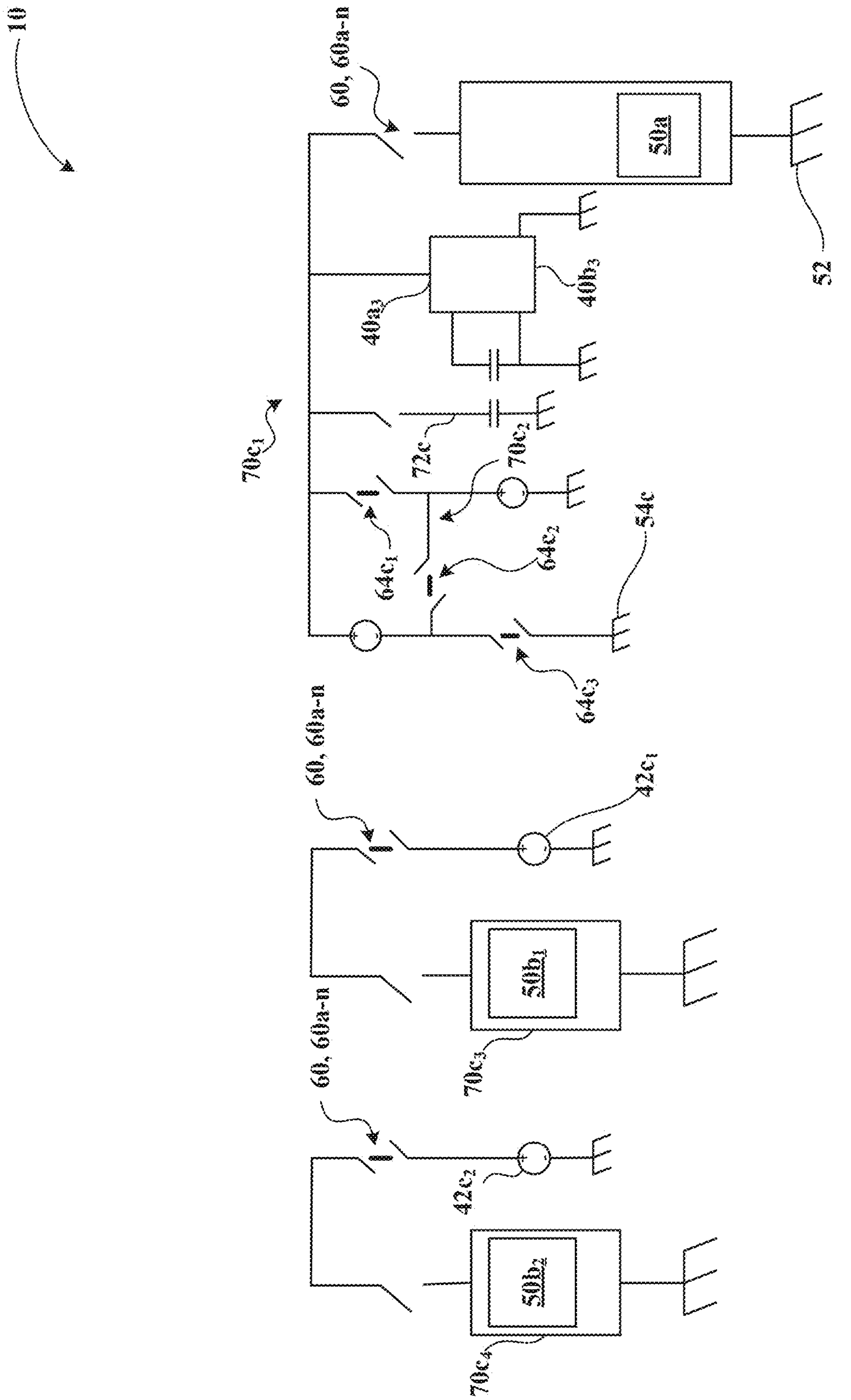
FIG. 13 is an exemplary schematic diagram of a mode of the power distribution system of FIG. 12.

With specific reference to FIGS. 11-13, a power distribution system 10$c$ is provided. In view of the substantial similarity in structure and function of the components associated with the power distribution system 10, like reference numerals are used hereinafter and in the drawings to identify like components, while like reference numerals containing letter and number extensions are used to identify those components that have been modified.

The power distribution system 10$c$ includes two converters 40$a_3$, 40$b_3$ that each include a pair of sub-converters 42$c$, 42$c_{1-n}$, described below. Each converter 40$a_3$, 40$b_3$ has a positive port 44$c$ and a negative port 46$c$ in connection with one or more buses 70$c$, 70$c_{1-n}$. For example, the positive port 44$c$ of the first converter 40$a_3$ is connected or otherwise coupled to a first bus 70$c_1$, and the negative port 46$c$ of the first converter 40$a_3$ is isolated from the chassis ground 52 to define a secondary ground 54$c$. The negative port 46$c$ of the second converter 40$b_3$ is connected or otherwise coupled to the chassis ground 52. The power distribution system 10$c$ also includes switches 60, 60$a$-$n$ including supplementary switches 64$c$, 64$c_{1-n}$.

A first supplementary switch 64$c_1$ is connected between the first bus 70$c_1$ and a second bus 70$c_2$. A second supplementary switch 64$c_2$ is connected between the secondary ground 54$c$ and the second bus 70$c_2$, and a third supplementary switch 64$c_3$ is connected between the secondary ground 54$c$ and the chassis ground 52. The power distribution system 10$c$ also includes an ultra or super cap 72$c$ that is coupled across the first bus 70$c_1$ and the chassis ground 52 via a current limiting device 74$c$. The current limiting device 74$c$ may include, but is not limited to, a single electronic switch, a resistor, or another converter.

With further reference to FIGS. 11-13, the power distribution system 10$c$ also includes a critical load 50$a$ between the first bus 70$c_1$ and the chassis ground 52 via a disconnect switch 76$c$. A first non-critical load 50$b_1$ between the first bus 70$c_1$ and the secondary ground 54 via a disconnect switch 60, 60$a$-$n$, and a second non-critical load 50$b_2$ between the second bus 70$c_2$ and the chassis ground 52 via the disconnect switch 60, 60$a$-$n$. The power distribution system 10$c$ may also have a third non-critical load 50$b_3$ connected across a third, non-critical bus 70$c_3$ and the chassis ground 52 through one of the switches 60, 60$a$-$n$. A fourth non-critical load 50$b_4$ may be connected across a fourth, non-critical bus 70$c_4$ through one of the switches 60, 60$a$-$n$.

As mentioned above, the converters 40$a_3$, 40$b_3$ have two pairs of sub-converters 42$c$, 42$c_{1-n}$. Each pair of sub-converters 42$c$, 42$c_{1-n}$ is enclosed in a single unit (i.e., one of the converters 40$a_3$, 40$b_3$) with isolated outlet ports 44$c$, 46$c$, described above. Further, each sub-converter 42$c$, 42$c_{1-n}$ has positive and negative outputs 80$c$, 82$c$. For example, the positive output 80$c$ of a first sub-converter 42$c_1$ is connected to the third, non-critical bus 70$c_3$ through a switch 60, 60$a$-$n$, and the negative output 82$c$ of first sub-converter 42$c_1$ is connected or otherwise coupled to the chassis ground 52. The positive output of a second sub-converter 42$c_2$ is connected or otherwise coupled to the first bus 70$c_1$, and the negative output 82$c$ of the second sub-converter 42$c_2$ is isolated from the chassis ground 52 to define the secondary ground 54. The positive output 80$c$ of a third sub-converter 42$c_3$ is connected or otherwise coupled to the fourth, non-critical bus 70$c_4$ through a switch 60, 60$a$-$n$, and the negative output 82$c$ of the third sub-converter 42$c_3$ is connected or otherwise coupled to the chassis ground 52. Finally, the negative output 82$c$ of a fourth sub-converter 42$c_4$ is connected or otherwise coupled to the chassis ground 52, and the positive output 80$c$ of the fourth sub-converter 42$c_4$ is connected to the second bus 70$c_2$.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A power distribution system for a vehicle, the power distribution system comprising:

a chassis ground;

at least two power sources;

a first converter coupled to at least one power source of the at least two power sources, the first converter including a first sub-converter and a second sub-converter and a negative port isolated from the chassis ground to define a secondary ground;

a second converter coupled to at least one power source of the at least two power sources, the second converter including a third sub-converter and a fourth sub-converter;

one or more buses coupled to the first converter and the second converter, the one or more buses including a first bus and a second bus;

a first supplementary switch coupled to and between the first bus and the second bus;

a second supplementary switch coupled to and between the secondary ground and the second bus;

a third supplementary switch coupled to and between the secondary ground and the chassis ground; and a controller operably coupled to each of the at least two power sources, the first converter, the second converter, and each of the first, second, and third supplementary switches, the controller configured with a power distribution architecture including modes.

2. The power distribution system of claim 1, further including a critical load and a plurality of non-critical loads.

3. The power distribution system of claim 2, wherein the plurality of non-critical loads includes a first non-critical load and a second non-critical load, the first non-critical load defined between the first bus and the secondary ground via a first disconnect switch and the second non-critical load defined between the second bus and the chassis ground by a second disconnect switch.

4. The power distribution system of claim 2, wherein the one or more buses includes a third bus and a fourth bus, the first and second sub-converters of the first converter being coupled to the third bus and the third and fourth sub-converters of the second converter being coupled to the fourth bus.

5. The power distribution system of claim 4, wherein at least one of the plurality of non-critical loads is connected across one of the third bus and the fourth bus and the chassis ground through a switch.

6. The power distribution system of claim 4, wherein the first converter includes a positive output and a negative output, the positive output being coupled to the third bus through a switch and the negative output being coupled to the chassis ground.

7. A power distribution system for a vehicle, the power distribution system comprising:

a chassis ground;

at least two power sources;

a first converter coupled to at least one power source of the at least two power sources, the first converter including a first sub-converter and a second sub-converter and a negative port isolated from the chassis ground to define a secondary ground;

a second converter coupled to at least one power source of the at least two power sources, the second converter including a third sub-converter and a fourth sub-converter;

one or more buses coupled to the first converter and the second converter, the one or more buses including a first bus and a second bus;

a super cap coupled across the first bus and the chassis ground;

a critical load;

a plurality of non-critical loads;

a first supplementary switch coupled to and between the first bus and the second bus;

a second supplementary switch coupled to and between the secondary ground and the second bus;

a third supplementary switch coupled to and between the secondary ground and the chassis ground; and a controller operably coupled to each of the at least two power sources, the first converter, the second converter, and each of the first, second, and third supplementary switches, the controller configured with a power distribution architecture including modes.

8. The power distribution system of claim 7, wherein the plurality of non-critical loads includes a first non-critical load and a second non-critical load.

9. The power distribution system of claim 8, wherein the first non-critical load is defined between the first bus and the secondary ground via a first disconnect switch and the second non-critical load is defined between the second bus and the chassis ground by a second disconnect switch.

10. The power distribution system of claim 8, wherein the one or more buses includes a third bus and a fourth bus.

11. The power distribution system of claim 10, wherein the first and second sub-converters of the first converter are coupled to the third bus and the third and fourth sub-converters of the second converter are coupled to the fourth bus.

12. The power distribution system of claim 10, wherein at least one of the plurality of non-critical loads is connected across one of the third bus and the fourth bus and the chassis ground through a switch.

13. The power distribution system of claim 10, wherein the first converter includes a positive output and a negative output, the positive output being coupled to the third bus through a switch and the negative output being coupled to the chassis ground.

14. The power distribution system of claim 7, further including a current limiting device, wherein the super cap is coupled across the first bus and the chassis ground via the current limiting device.

15. A power distribution system for a vehicle, the power distribution system comprising:

a chassis ground;

at least two power sources;

a first converter coupled to at least one power source of the at least two power sources, the first converter including a first sub-converter and a second sub-converter and a positive port and a negative port isolated from the chassis ground to define a secondary ground;

a second converter coupled to at least one power source of the at least two power sources, the second converter including a third sub-converter and a fourth sub-converter and a positive port and a negative port, the negative port of the second converter coupled to the chassis ground;

one or more buses coupled to the first converter and the second converter, the one or more buses including a first bus connected to the positive port of the first converter and a second bus;

a first supplementary switch coupled to and between the first bus and the second bus;

a second supplementary switch coupled to and between the secondary ground and the second bus;

a third supplementary switch coupled to and between the secondary ground and the chassis ground; and a controller operably coupled to each of the at least two power sources, the first converter, the second converter, and each of the first, second, and third supplementary switches, the controller configured with a power distribution architecture including modes.

16. The power distribution system of claim 15, further including a critical load and a plurality of non-critical loads.

17. The power distribution system of claim 16, wherein the plurality of non-critical loads includes a first non-critical load and a second non-critical load, the first non-critical load is defined between the first bus and the secondary ground via a first disconnect switch and the second non-critical load is defined between the second bus and the chassis ground by a second disconnect switch.

18. The power distribution system of claim 16, wherein the one or more buses includes a third bus and a fourth bus, the first and second sub-converters of the first converter being coupled to the third bus and the third and fourth sub-converters of the second converter being coupled to the fourth bus.

19. The power distribution system of claim 18, wherein at least one of the plurality of non-critical loads is connected across one of the third bus and the fourth bus and the chassis ground through a switch.

20. The power distribution system of claim 18, wherein the first converter includes a positive output and a negative output, the positive output being coupled to the third bus through a switch and the negative output being coupled to the chassis ground.

* * * * *